United States Patent
SeyedzadehDelcheh et al.

(10) Patent No.: US 12,130,701 B1
(45) Date of Patent: Oct. 29, 2024

(54) RESIDUE-CODE-BASED ERROR DETECTION FOR CIPHER GENERATION

(71) Applicant: ADVANCED MICRO DEVICES, INC., Santa Clara, CA (US)

(72) Inventors: SeyedMohammad SeyedzadehDelcheh, Bellevue, WA (US); Wei Chen, Camas, WA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 18/213,375

(22) Filed: Jun. 23, 2023

(51) Int. Cl.
G06F 11/00 (2006.01)
G06F 11/10 (2006.01)
G06F 21/60 (2013.01)

(52) U.S. Cl.
CPC .......... G06F 11/102 (2013.01); G06F 21/602 (2013.01)

(58) Field of Classification Search
None
See application file for complete search history.

(56) References Cited

U.S. PATENT DOCUMENTS

| | | | | |
|---|---|---|---|---|
| 7,770,016 B2* | 8/2010 | Horne | ...................... | H04K 1/00 713/176 |
| 7,886,143 B2* | 2/2011 | Qi | ........................... | G09C 1/00 380/42 |
| 2012/0079236 A1* | 3/2012 | Suvakovic | .......... | G06F 15/7867 712/30 |
| 2013/0019140 A1* | 1/2013 | Rogers, Jr. | ............ | G06F 21/572 714/E11.032 |
| 2021/0279055 A1* | 9/2021 | Saxena | ................... | G06F 17/16 |

OTHER PUBLICATIONS

Chien, R. "On linear residue codes for burst-error correction," IEEE Transactions on Information Theory, vol. 10, No. 2: 1964, pp. 127-133 doi: 10.1109/TIT.1964.1053662.
Manzhosov, E. et al., "Revisiting Residue Codes for Modern Memories," in Micro 2022.
Reed, I. and G. Solomon, "Polynomial codes over certain finite fields," Journal of the society for industrial and applied mathematics, in 1960.

* cited by examiner

*Primary Examiner* — Mujtaba M Chaudry

(57) ABSTRACT

A processing unit employs a residue code (RC) to perform error detection and correction for a multi-round transformation data encryption process. The processing unit generates a cipher based on a plurality of transformations. For each of the plurality of transformations, the processing unit generates a corresponding residue code of a plurality of residue codes. The processing unit performs error detection for the cipher based on the plurality of residue codes.

20 Claims, 5 Drawing Sheets

FIG. 3

RESIDUE-CODE-BASED ERROR DETECTION FOR CIPHER GENERATION

BACKGROUND

In many processing systems, it is desirable to protect at least some of the data being processed from unauthorized access. For example, in a confidential computing environment, a processing system (e.g., a server) executes multiple software programs, such as virtual machines and a virtual machine manager (e.g., a hypervisor) to create a virtualized computing environment, wherein different software programs are owned by different entities. Further, in some confidential computing environments, different virtual machines executed by the environment are owned by different companies, and it is therefore useful to protect data associated with one virtual machine from unauthorized access by another virtual machine (or other malicious entity).

One approach to protecting data from unauthorized access is data encryption, wherein the processing system encrypts data based on a unique key (e.g., a key associated with a virtual machine) and storing the encrypted data at system memory. In at least some cases, the data encryption is based on a multi-round transformation encryption process, such as an Advanced Encryption Standard (AES) process. In such a process, the data to be encrypted undergoes multiple encryption rounds, with each round involving one or more transformations of the data. However, while multi-round transformation encryption provides good data encryption, these processes are sensitive to errors. For example, in some cases a single-bit error in one of the transformations will propagate through subsequent transformations, thereby corrupting the encrypted data.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

FIG. 3 is a block diagram illustrating lookup tables of the data encryption engine and checkbit engine of FIG. 2 in accordance with some embodiments.

DETAILED DESCRIPTION

Figure 1:
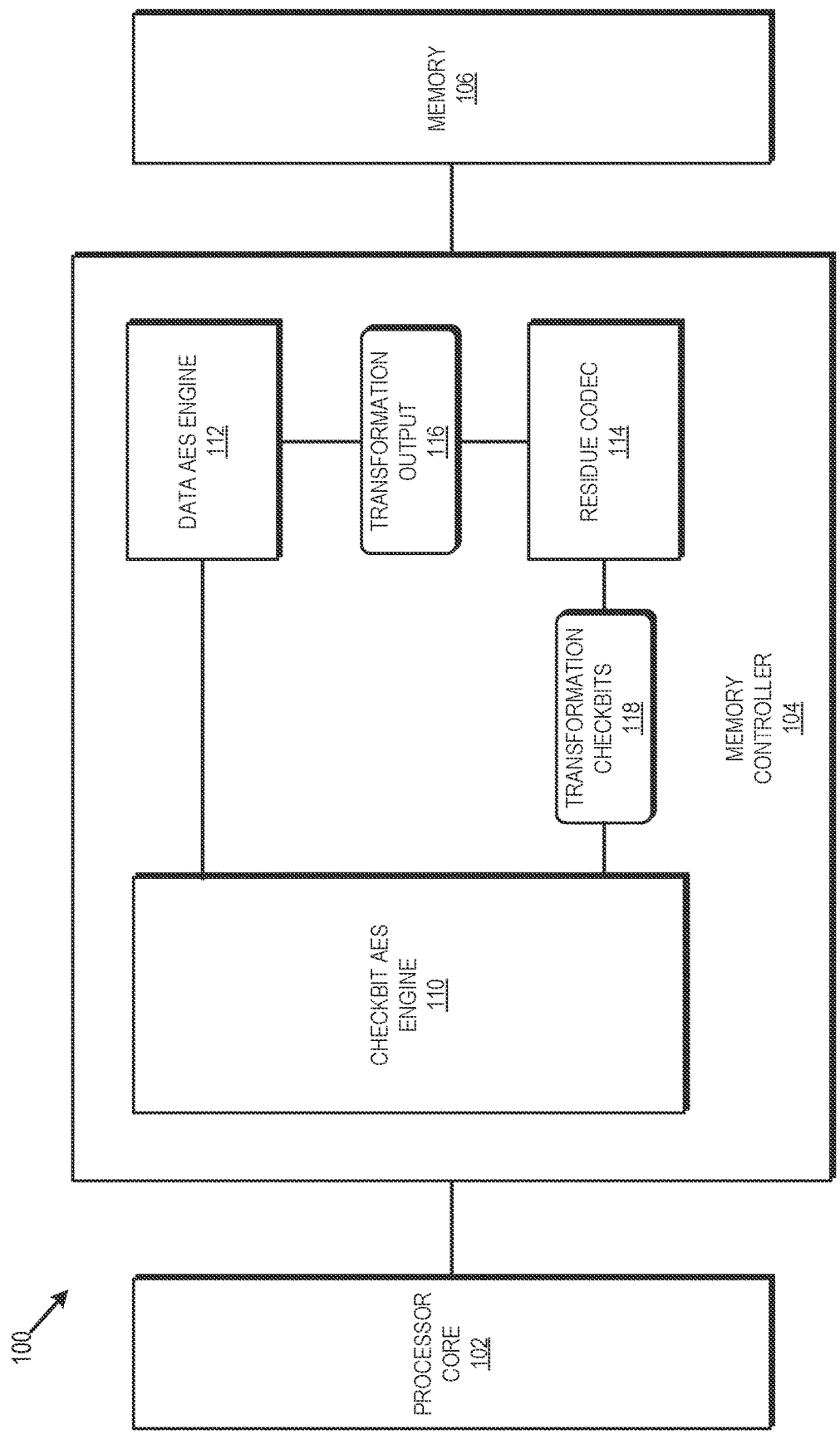
FIG. 1 is a block diagram of a processor that employs a residue code for error detection and correction while executing a data encryption process in accordance with some embodiments.

FIGS. 1-5 illustrate techniques for employing a residue code (RC) at a processing system to perform error detection and correction for a multi-round transformation data encryption process. By employing the RC code, the processing system is able to detect and correct errors during the encryption process itself, rather than (or in addition to) performing error detection and correction based only on the stored encrypted data. The processing system thereby improves the reliability and resiliency of the data encryption process.

To illustrate via an example, in some embodiments a processor encrypts data to be stored at a memory by employing an AES encryption process. AES encryption involves multiple rounds, with each round involving multiple transformations (e.g., SubBytes: a non-linear substitution transformation, a transposition transformation, a linear mixing transformation, and a byte XOR transformation). Conventionally, error detection and correction is performed on stored data after the encryption process is complete. However, these storage-oriented error detection approaches are not able to detect or correct errors that occur during an AES transformation, because the error propagates through subsequent transformations and corrupts the output data.

In contrast to this conventional approach, in some embodiments a processor employs an RC-based error correction and detection process. The checkbits for the RC-based error correction and detection are calculated in parallel with the corresponding transformations of the AES encryption process. This allows the processor to perform error detection and correction on the results of each individual AES transformation, rather than on the ciphertext output of the AES encryption process as a whole, thereby improving the resiliency of the AES encryption process.

In some embodiments, to implement RC-based error correction and detection, a processor employs three modules: a residue codec to perform error detection and correction; 2) two AES engines (referred to as a data AES engine and checkbit AES engine, respectively), one to perform the AES encryption transformations and one to perform the operations to generate the corresponding checkbits for each AES encryption transformation; and 3) two lookup tables including a mapping check bit lookup table for the SubBytes transformation of the AES encryption process and an operand check bit lookup table. In these embodiments, the processor generates the check bits of data inputs via look-up tables (LUTs) and then feeds generated check bits and data inputs to the AES transformation engines in parallel. The residue codec uses the outputs of the check bit transformation and data transformations to detect and correct errors that happen during computation. If the number of errors is greater than the residue codec's correction capability, the residue codec raises a flag indicating a detectable and uncorrectable error.

It will be appreciated that the examples above, and the example embodiments set forth below, are described with respect to a general-purpose processor, and further that the techniques described herein apply to different types of processors, processing units, and processing systems. For example, in some embodiments the RC-based error detection and correction techniques described herein are implemented using any of a variety of parallel processors (e.g., vector processors, graphics processing units (GPUs), general-purpose GPUs (GPGPUs), non-scalar processors, highly-parallel processors, artificial intelligence (AI) processors, inference engines, machine learning processors, other multithreaded processing units, and the like).

FIG. 1 illustrates a block diagram of a processor 100 that implements RC-based error detection and correction for data encryption in accordance with some embodiments. In some embodiments, the processor 100 is a general purpose processor that is configured to execute sets of instructions (e.g., software programs) to carry out specified tasks on behalf of an electronic device. Accordingly, in different embodiments the processor 100 is part of a desktop computer, laptop computer, server, tablet, smartphone, game console, and the like. To support execution of the sets of instructions, the processor 100 includes a processor core 102, a memory controller 104, and a memory 106.

The processor core 102 is a set of circuits generally configured to execute sets of instructions for the processor 100. Thus, in some embodiments the processor core 102 includes one or more instruction pipelines to fetch instructions, decode the instructions into one or more operations, dispatch the operations to one or more execution units of the instruction pipeline, and retire the instructions. It will be appreciated that, while in the example of FIG. 1 the processor 100 is described with respect to a single processor core, in other embodiments the processor core includes additional processor cores.

The memory 106 is a memory module configured to store data for the processor 100. Thus, in some embodiments the memory 106 is dynamic random access memory (DRAM), non-volatile memory (NVM), and the like, or any combination thereof. In the depicted embodiment, the memory 106 is illustrated as part of the processor core 102. However, in other embodiments, at least a portion of the memory 106 is system memory external to the processor core 102.

The memory controller 104 is a set of circuits configured to provide an interface between the processor core 102 and the memory 106. For example, in some embodiments, the processor core 102 generates memory access requests in the course of executing instructions. Examples of these memory access requests include read operations to retrieve data from the memory 106 and write operations to write data to the memory 106. The memory controller 104 is generally configured to perform operations to facilitate execution of the memory access requests. Examples of such operations include queuing of memory access requests and responsive data, memory address translation (e.g., translating virtual memory addresses to physical memory addresses), generating and managing control signaling to and from the memory 106 to store and retrieve data, and the like.

In addition to the above operations, the memory controller 104 is configured to encrypt data prior to storing the data at the memory 106. For example, in response to receiving a write request from the processor core 102, the memory controller 104 encrypts the data associated with the write request based on an encryption key, such as an encryption key associated with the program that generated the write request. After encrypting the data, the memory controller 104 stores the encrypted data at the memory 106. In response to a read request to retrieve encrypted data, the memory controller 104 retrieves the requested encrypted data from the memory 106, decrypts the retrieved data with the corresponding key, and provides the resulting decrypted data (also referred to as plaintext) to the processor core 102. In some embodiments, the memory controller 104 uses a similar process to encrypt the data for storage a the memory 106.

To facilitate encrypting data, the memory controller 104 includes a data AES engine 112 that is configured to encrypt received data (e.g., data to be written to the memory 106) using an AES encryption process, and based on a received encryption key. The data AES engine 112 thus includes one or more circuits that together perform the AES encryption process, including circuits to perform each data transformation of the process.

To illustrate, in some embodiments the data AES engine 112 implements an AES encryption process as a symmetric block cipher algorithm with a block size of 128 bits. The data AES engine converts 128-bits plaintexts to 128-bits ciphertexts using keys of 128, 192 and 256 bits. The key size determines the number of transformation rounds executed by the data AES engine 112. For each round, except the final round, the data AES engine performs four transformations: 1. a non-linear substitution transformation (referred to as a SubBytes transformation) where each byte is replaced with another according to a lookup table; 2. a transposition transformation (referred to as a ShiftBytes transformation) where the last three rows of the state are shifted cyclically a certain number of steps; 3. a linear mixing transformation (referred to as a MixColumns transformation) which operates on the columns of the state, combining the four bytes in each column; and 4. a simple byte XOR transformation between a new key and the output of MixColumns (this XOR transformation is referred to as an AddRound Key transformation). For the initial round, an additional AddRound Key transformation is performed, while for the final round the MixColumns transformation is not performed.

In some cases, the data generated by a particular transformation will have one or more errors. As noted above, if uncorrected these errors propagate through subsequent transformations, thereby corrupting the encrypted data output by the data AES engine 112. To detect and correct such errors, the memory controller 104 includes a checkbit AES engine 110 and a residue codec 114. The checkbit AES engine 110 is a set of circuits generally configured to generate corresponding checkbits, as described further below, for each transformation executed by the data AES engine 112. That is, for each transformation, the data AES engine 112 generates a transformation output 116, and the checkbit AES engine 110 generates corresponding checkbits 118. In some embodiments, to improve efficiency the checkbit AES engine 110 generates the checkbits concurrent with the data AES engine 112 generating the corresponding checkbits.

The residue codec 114 is circuitry that is configured to perform error detection and correction based on the residue code, as represented by the checkbits 118. That is, the residue code is checkbit data (checkbits 118) used for error detection and correction. The residue codec 114 is the hardware circuitry that performs error detection and correction using the residue code. In particular, the residue codec 114 receives the transformation output 116 and the corresponding checkbits 118 and, based on a specified RC error detection process, detects whether the transformation output 116 has an error. For example, in some embodiments the residue codec 114 stores an error table (not shown) of remainder values, wherein each different remainder value is pre-calculated and assigned to a different pattern. The residue codec 114 further stores a multiplier value that has been pre-calculated to generate the unique remainder value for each pattern. The residue codec 114 divides one or both of the received transformation output 116 and corresponding checkbits 118 with the multiplier to generate a remainder, and uses the generated remainder to access the error table to determine if there is a matching pattern. If so, the residue codec 114 uses the matching pattern correct the error, if possible.

If the residue codec 114 detects an error, it then determines the size of the error (e.g., the number of bits that are in error) and whether the identified size of error is correctable. If the error is of a correctable size, the residue codec 114 corrects the error according to the specified RC error detection process. If the error is too large to be corrected, the residue codec 114 sets a flag (not shown) indicating the uncorrectable error to the memory controller 104. In response, the processor core 102 takes remedial action, such as discarding the corrupted data and making another encryption attempt. Thus, the processor 100 is able to detect and correct errors for at least a subset of the transformations of the encryption process, and in some embodiments for each transformation of the encryption process, thereby improving the overall resiliency of the encryption.

Figure 2:
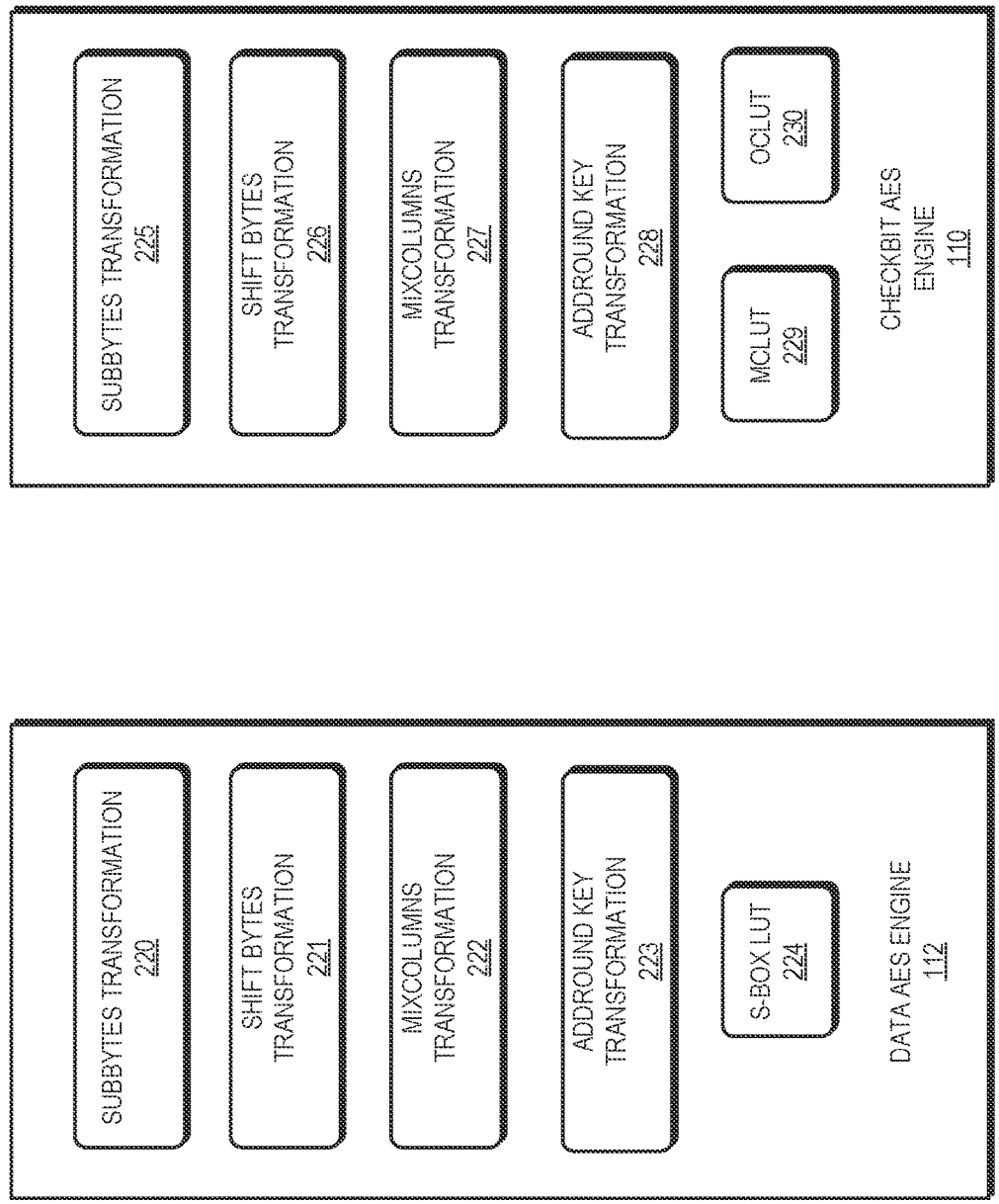
FIG. 2 is a block diagram of a data encryption engine and corresponding checkbit engine of the processor of FIG. 1 in accordance with some embodiments.

FIG. 2 illustrates a block diagram of the data AES engine 112 and the checkbit AES engine 110 in accordance with some embodiments. The data AES engine 112 encrypts data by performing a number of transformation rounds, where the number of rounds depends on the size of the encryption key. For each round, the data AES engine 112 performs a plurality of operations, including a SubBytes transformation 220, a ShiftBytes transformation 221, a MixColumns transformation 222, and an AddRound Key transformation 223. In some embodiments, for the initial round, the data AES engine 112 performs an additional AddRound Key transformation, and for the final round does not perform a MixColumns transformation.

The checkbit AES engine 110 generates corresponding checkbits for each transformation performed by the data AES engine 112. Thus, for each round of the encryption process, the checkbit AES engine performs a SubBytes transformation 225 (to generate checkbits for the SubBytes transformation 220), a ShiftBytes transformation 226 (to generate checkbits for the ShiftBytes transformation 221), a MixColumns transformation 227 (to generate checkbits for the MixColumns transformation 222), and an AddRound Key transformation 228 (to generate checkbits for the AddRound Key transformation 223). In some embodiments, for the initial round, the data AES engine performs an additional AddRound Key transformation, and for the final round does not perform a MixColumns transformation. The operation of each of the transformations 220-223 and corresponding checkbit transformations 225-228 are described in more detail below.

The SubBytes transformation 220 in each round divides the binary input stream (e.g., a 128-bit input stream) to a set of operands (e.g., 16 8-bit operands) and then maps each operand via an S-box lookup table (LUT) 224. In some embodiments, the S-box LUT 224 represents a Rijndael S-box. The checkbit AES engine 110 generates check bits of all existing values in the S-box lookup table 224. In some embodiments the S-box lookup table implements the specified S-box for the AES process, and thus performs a multiplicative inverse and an affine transformation process. The checkbit AES engine 110 stores the identified checkbits in a lookup table, designated MCLUT 229. An example of portions of the S-box LUT 224 and MCLUT are illustrated at FIG. 3 in accordance with some embodiments (only a portion of each LUT is shown for clarity).

Figure 3:
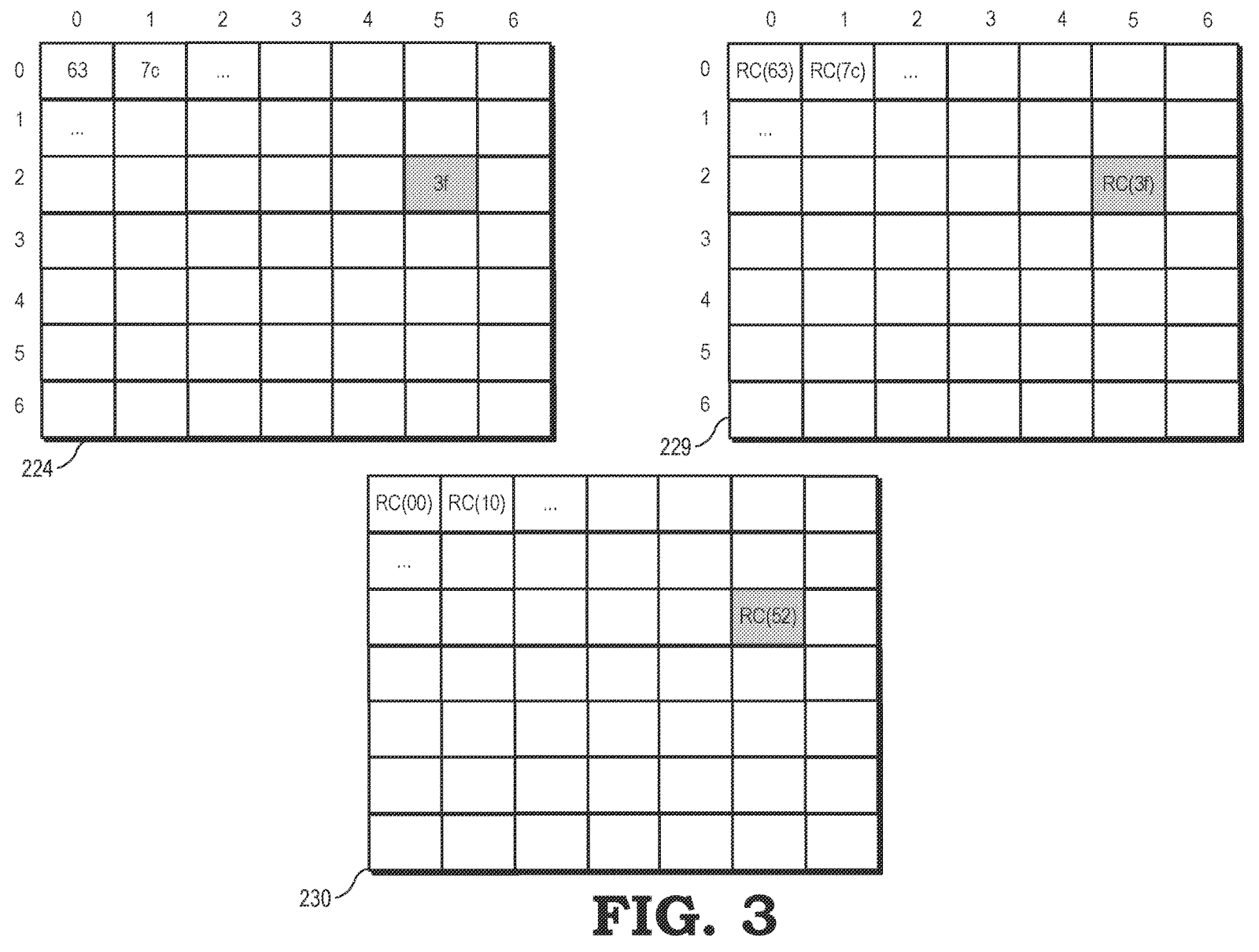

As shown in FIG. 3, the S-box LUT 224 includes a number of entries that map input values to output values. In some embodiments, the input value is a two digit value, designated "X", wherein the first digit of X identifies a column of the S-box LUT 224 and the second digit of X indicates a row of the S-box LUT 224. The output of the SubBytes transformation 220 is designated "Y", and the value of Y corresponds to the entry of the S-box LUT 224 indicated by the input value X. The SubBytes transformation 225 employs the LUT 229 in similar fashion. Thus, for example, the SubBytes transformation 220 maps the input "X=52" to the output "Y=3f" based on the S-box LUT 224. Concurrently, the SubBytes transformation 225 of the checkbit AES engine 110 maps the input "X=52" to the check bits of "Y", called RC("Y") based on the LUT 229. Thus, in the example above, the SubBytes transformation 225 retrieves the checkbits RC(52) from the MCLUT 229, as shown in FIG. 3. When "Y" and RC("Y") become available, the residue codec 114 uses the data and corresponding checkbits to detect and correct errors for the SubBytes transformation 220.

Figure 4:
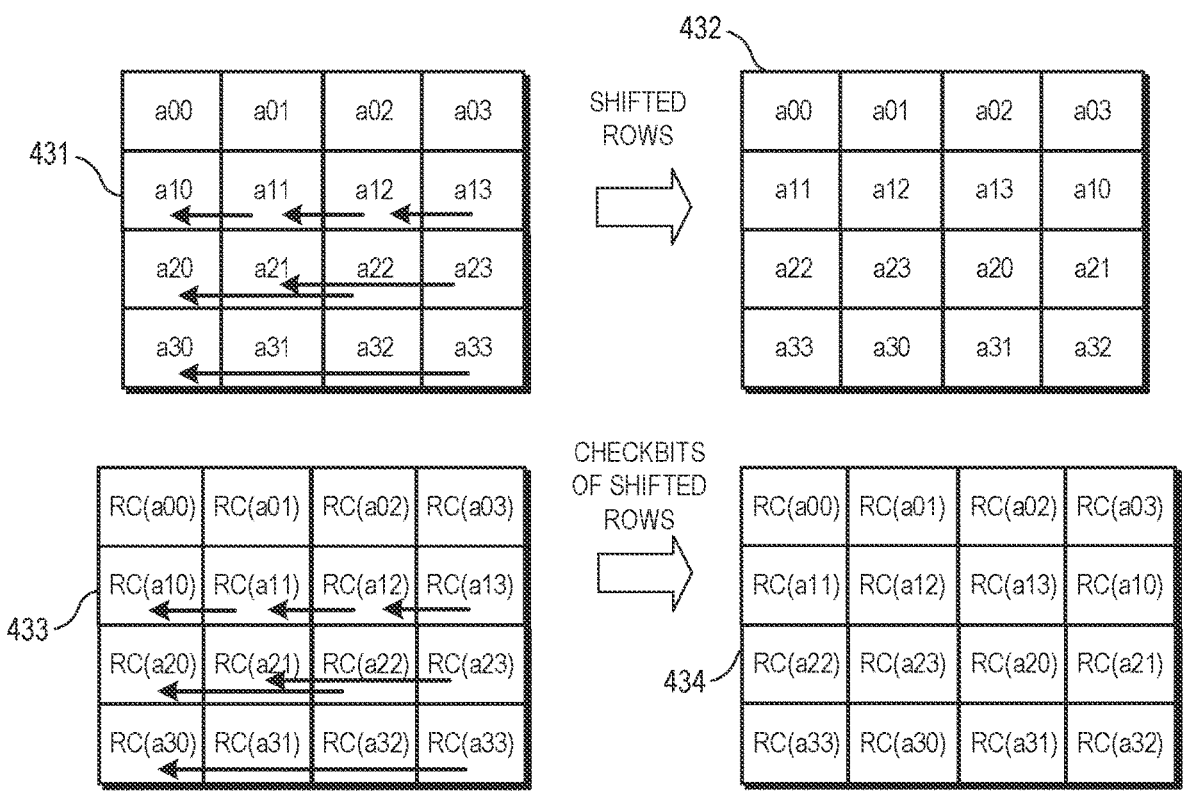
FIG. 4 illustrates an example of shift transformation at the data encryption engine and checkbit engine in accordance with some embodiments.

The ShiftBytes transformation 221 of the data AES engine 112 shifts the input $a_{i,j}$, with the input provided by the SubBytes transformation 220. An example is illustrated at FIG. 4 in accordance with some embodiments. In the illustrated example, the input data provided by the SubBytes transformation 220 is a 4×4 matrix, designated matrix 431. The ShiftBytes transformation 221 generates a matrix 432 by shifting each row of the matrix 431 by a corresponding amount, with no shift to the first row, a one-entry shift to the left to the second row, a two-entry shift to the left to the third row, and a three-entry shift to the left for the fourth row. The ShiftBytes transformation 226 performs a similar corresponding shift operation for the RC data provided by the SubBytes transformation 225. Thus, in the example of FIG. 4, the ShiftBytes transformation 226 received from the SubBytes transformation 225 a 4×4 matrix 433, storing residue codes corresponding to the matrix 431. The ShiftBytes transformation 226 shifts the entries of the matrix 433 in similar fashion as described above with respect to the ShiftBytes transformation 221, thus generating the matrix 434. The residue codec 114 uses the matrix 432 and corresponding checkbits of the matrix 434 to detect and correct errors for the ShiftBytes transformation 221.

The MixColumns transformation 222 combines the four bytes of each column of the previous transformation (e.g., the ShiftBytes transformation 221) using an invertible linear transformation, as shown in the following example:

$$\underbrace{\begin{bmatrix} b_{0,j} \\ b_{1,j} \\ b_{2,j} \\ b_{3,j} \end{bmatrix}}_{b} = \underbrace{\begin{bmatrix} 2 & 3 & 1 & 1 \\ 1 & 2 & 3 & 1 \\ 1 & 1 & 2 & 3 \\ 3 & 1 & 1 & 2 \end{bmatrix}}_{cx} \underbrace{\begin{bmatrix} a_{0,j} \\ a_{1,j} \\ a_{2,j} \\ a_{3,j} \end{bmatrix}}_{a} \quad 0 \le j \le 3$$

During the MixColumns transformation 222, each column is transformed using a fixed matrix. Matrix multiplication is composed of multiplication and addition of the entries. In some embodiments, entries of the matrix are bytes treated as coefficients of polynomial of order $x^7$. Addition is performed by executing an XOR operation, while multiplication is executed according to the modulo irreducible polynomial $x^8+x^4++x^3+x^1+1$. In some embodiments, the MixColumns transformation 222 is processed bit by bit and, after shifting, a conditional XOR with $1B_{16}$ is performed if the shifted value is larger than $FF_{16}$ (overflow is corrected by subtraction of the generating polynomial). These are special cases of the usual multiplication in GF(28).

In some embodiments, the MixColumns transformation 222 performs the matrix multiplication to transform inputs $a_{i,j}$ to the outputs $b_{i,j}$ as follows.

$$b_{i,j}=c_{xi,0}\cdot a_{0,j}+c_{xi,1}\cdot a_{1,j}+c_{xi,2}\cdot a_{2,j}+c_{xi,3}\cdot a_{3,j}$$

In some embodiments, the MixColumns transformation 227 generates checkbits for the MixColumns transformation 222 using the following formulas:

$$RC(b_{i,j})=RC(c_{xi,0}\cdot a_{0,j}+c_{xi,1}\cdot a_{1,j}+c_{xi,2}\cdot a_{2,j}+c_{xi,3}\cdot a_{3,j})$$

$$RC(b_{i,j})=RC(c_{xi,0}\cdot a_{0,j})+RC(c_{xi,1}\cdot a_{1,j})+RC(c_{xi,2}\cdot a_{2,j})+RC(c_{xi,3}\cdot a_{3,j})$$

For example, the outputs of the first row of the MixColumns transformation 227 are calculated as follows:

$$RC(b_{0,j})=RC(2 \cdot a_{0,j})+RC(3 \cdot a_{1,j})+RC(1 \cdot a_{2,j})+RC(1 \cdot a_{3,j})$$

$$RC(b_{0,j})=RC(2 \cdot a_{0,j})+RC((2+1) \cdot a_{1,j})+RC(1 \cdot a_{2,j})+RC(1 \cdot a_{3,j})$$

$$RC(b_{0,j})=RC(2 \cdot a_{0,j})+RC(2 \cdot a_{1,j})+RC(a_{1,j})+RC(a_{2,j})+RC(a_{3,j})$$

The residue codec 114 employs the checkbits generated by the MixColumns transformation 227 to perform error detection and correction for the output of the MixColumns transformation 222. In some embodiments, the checkbits generated by the MixColumns transformation 227 are $a_{1,j}$, $a_{2,j}$, $a_{3,j}$ and shifted values "$2 \cdot a_{0,j}$" and $2 \cdot a_{1,j}$ and all values range from 0 to 255. In some embodiments, the checkbit AES engine 110 stores the checkbits at an LUT, designated OCLUT 230. An example of the OCLUT 230 is illustrated at FIG. 3. Thus, for example, in some embodiments the OCLUT 230 is accessed based on an 8-bit input representing two digits, with a first digit of the input indicating the column of the OCLUT 230 and the second digit indicating a row of the OCLUT (e.g., the input "52" in the hexadecimal format returns check bits (RC("52")).

The AddRound Key transformation 223 transforms the output of the MixColumns transformation 222 with a new key, such as a key generated by a key expansion unit that generates keys for each round according to the AES key schedule. In particular, the AddRound Key transformation 223 performs an XOR operation based on each byte of the output of the MixColumns transformation 222 and a corresponding portion of the new key. The AddRound Key transformation 228 generates corresponding checkbits by transformation fetching the check bits of the new key from the OCLUT 230 and performing an XOR operation with the check bits of the MixColumns transformation 227. For example, in some embodiments, the output of the MixColumns transformation 227 is a 4×4 matrix, and the AddRound Key transformation 228 performs an XOR operation for each entry of the 4×4 matrix with the corresponding entry of the OCLUT 230. The residue codec 114 uses the checkbits generated by the AddRound Key transformation 228 to perform error detection and correction for the output of the AddRound Key transformation 223.

Figure 5:
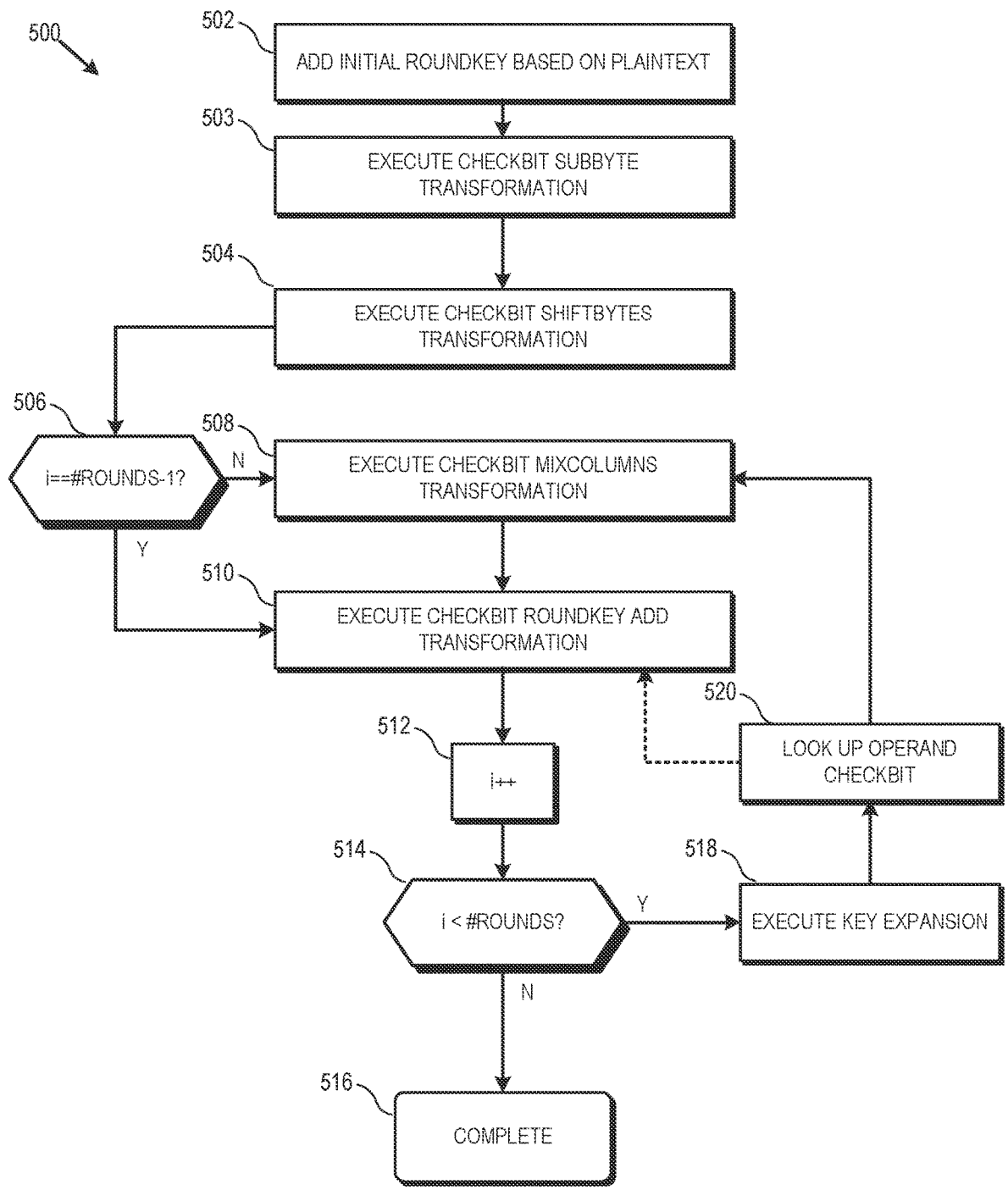
FIG. 5 is a flow diagram of a method of employing a residue code for error detection and correction while executing a data encryption process in accordance with some embodiments.

FIG. 5 illustrates a flow diagram of a method 500 of employing a residue code for error detection and correction while executing a data encryption process in accordance with some embodiments. For purposes of description, the method 500 is described with respect to an example implementation at the processor 100 of FIG. 1. However, it will be appreciated that in other embodiments, the method 500 is implemented in processors or other devices having a different configuration. It will further be appreciated that, for purposes of description, it is assumed that the data AES engine 112 is encrypting input data, referred to as plaintext, according to an AES process. In particular, the data AES engine 112 is performing a set of encryption rounds, with the number of rounds based on the length of the corresponding encryption key. The number of the current round of encryption is designated by the letter "i" in FIG. 5, with i initially set to a designated initial value (e.g., zero). The plaintext is transformed by the transformations of each round into different states. The state of the input data at a given point in time during the encryption process is referred to herein as the "current encryption data state".

At block 502, the checkbit AES engine 110 performs an initial AddRound Key transformation 228. For example, in some embodiments the checkbit AES engine 110 identifies a set of checkbits for the corresponding key using the MCLUT 229, and then performs an XOR operation based on the identified checkbits corresponding entry of the OCLUT 230. That is, in some embodiments the initial AddRound Key process XORs the initial key and plaintext. The OCLUT 230 is employed to fetch and XOR the corresponding check bits of the initial key and the plaintext for detection and correction purposes. In some embodiments, the residue codec 114 uses the resulting checkbits to perform error detection and correction for an initial AddRound Key transformation 223 performed by the data AES engine 112 based on the input plaintext data.

At block 503, the checkbit AES engine 110 performs a SubByte transformation 225 based on the current encryption data state. In some embodiments, the data AES engine 112 concurrently performs a SubBytes transformation 220 using the current encryption data state. The residue codec 114 uses the checkbits generated by the SubByte transformation 225 to perform error detection and correction for the output data of the SubBytes transformation 220.

At block 504, the checkbit AES engine 110 performs a ShiftBytes transformation 226 based on the output of the SubBytes transformation 225. In some embodiments, the data AES engine 112 concurrently performs a ShiftBytes transformation 221 using the current encryption data state. The residue codec 114 uses the checkbits generated by the ShiftBytes transformation 226 to perform error detection and correction for the output data of the ShiftBytes transformation 221.

At block 506, the checkbit AES engine 110 determines if the value of i is one less than the designated number of rounds. That is, the checkbit AES engine 110 determines if the current encryption round is the final round of the encryption process. If so, the method flow moves to block 510, described below. Thus, for the final round, the checkbit AES engine does not perform a MixColumns transformation 227 (similarly, for the data AES engine 112 does not perform a MixColumns transformation 222 for the final round of encryption). If, at block 506, the checkbit engine 110 determines that the current encryption round is not the final round of encryption, the method flow moves to block 508 and the checkbit AES engine performs a MixColumns transformation 227 based on the output of the ShiftBytes transformation 226 at block 504. The residue codec 114 uses the checkbits generated by the MixColumns transformation 227 to perform error detection and correction for the output data of the corresponding MixColumns transformation 222. The method flow proceeds to block 510.

At block 510, the checkbit AES engine 110 performs an AddRound Key transformation 228 based on the output of the MixColumns transformation 227 or, in the final encryption round, based on the output of the ShiftBytes transformation 226. In some embodiments, the data AES engine 112 concurrently performs an AddRound Key transformation 223 using the current encryption data state. The residue codec 114 uses the checkbits generated by the AddRound Key transformation 228 to perform error detection and correction for the output data of the AddRound Key transformation 223.

At block 512, the checkbit AES engine 110 increments the value of i and, at block 514 identifies whether the value of i matches the required number of rounds. That is, the checkbit AES engine determines whether all of the encryption rounds have been completed. If so, the method moves to block 516 and the generation of checkbits for the current encryption process is completed. If there are remaining rounds of the encryption process, the method moves to block 518 and the checkbit AES engine 110 performs key expansion based on the output of the AddRound Key transformation 223, according the specified AES process and the AES key schedule, thereby generating a unique key for each round. The method flow proceeds to block 520 and the checkbit AES engine uses the OCLUT to identify the operand checkbit for the next RoundKey Add transformation 223. The method then returns to block 508 for the next round of encryption.

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
    at a processing unit, generating a cipher based on a plurality of transformations;
    for each of the plurality of transformations, generating a corresponding residue code; and
    performing error detection for the cipher based on each corresponding residue code.

2. The method of claim 1, wherein generating the corresponding residue code comprises generating the corresponding residue code concurrent with a corresponding transformation of the plurality of transformations.

3. The method of claim 1, wherein performing error detection comprises:
    for each of the plurality of transformations, performing error correction based on a corresponding transformation output and based on the corresponding residue code.

4. The method of claim 1, wherein generating the corresponding residue code comprises:
    for a first transformation of the plurality of transformations, generating a first residue code; and
    for a second transformation of the plurality of transformations, generating a second residue code based on the first residue code.

5. The method of claim 4, wherein generating the second residue code comprises:
    performing the first transformation with the first residue code.

6. The method of claim 1, wherein the plurality of transformations includes a non-linear substitution transformation.

7. The method of claim 1, wherein the plurality of transformations includes a transposition transformation.

8. The method of claim 1, wherein the plurality of transformations includes a linear mixing transformation.

9. The method of claim 1, wherein the plurality of transformations includes an XOR transformation.

10. A method, comprising:
    generating, at a processing unit, an Advanced Encryption Standard (AES) cipher; and
    performing error detection for the AES cipher based on a residue code generated concurrently with the AES cipher.

11. The method of claim 10, wherein performing error detection comprises performing error detection based on a plurality of residue codes generated concurrently with corresponding performing transformations to generate the AES cipher.

12. A processing unit, comprising:
    a cipher engine to generate a cipher based on a plurality of transformations;
    a checkbit engine to, for each of the plurality of transformations, generate a corresponding residue code; and
    a residue codec to perform error detection for the cipher based on each corresponding residue code.

13. The processing unit of claim 12, wherein the checkbit engine is to generate the corresponding residue code concurrent with the cipher engine performing a corresponding transformation of the plurality of transformations.

14. The processing unit of claim 12, wherein the residue codec is perform error correction based on a corresponding transformation output and on the corresponding residue code.

15. The processing unit of claim 12, wherein the checkbit engine is to:
    for a first transformation of the plurality of transformations, generate a first residue code; and
    for a second transformation of the plurality of transformations, generate a second residue code based on the first residue code.

16. The processing unit of claim 15, wherein the checkbit engine is to generate the second residue code by:
   performing the first transformation with the first residue code.

17. The processing unit of claim 12, wherein the plurality of transformations includes a non-linear substitution transformation.

18. The processing unit of claim 12, wherein the plurality of transformations includes a transposition transformation.

19. The processing unit of claim 12, wherein the plurality of transformations includes a linear mixing transformation.

20. The processing unit of claim 12, wherein the plurality of transformations includes an XOR transformation.

* * * * *